(12) United States Patent  (10) Patent No.: US 7,929,204 B2
Lin  (45) Date of Patent: Apr. 19, 2011

(54) INFRARED CUT FILTER AND LENS MODULE USING THE SAME

(75) Inventor: Juin-Hong Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/108,036

(22) Filed: Apr. 23, 2008

(65) Prior Publication Data

US 2009/0108186 A1 Apr. 30, 2009

(30) Foreign Application Priority Data

Oct. 31, 2007 (CN) .......................... 2007 1 0202316

(51) Int. Cl.
*F21V 9/04* (2006.01)
*F21V 9/06* (2006.01)
*G02B 5/08* (2006.01)
*G02B 5/20* (2006.01)

(52) U.S. Cl. ...................................... 359/359; 359/723

(58) Field of Classification Search .................. 359/359, 359/588, 723
See application file for complete search history.

(56) References Cited

U.S. PATENT DOCUMENTS 5,982,423 A 11/1999 Sekiguchi
7,684,113 B2 * 3/2010 Yamada et al. ............... 359/359

FOREIGN PATENT DOCUMENTS

| CN | 2479526 Y | 2/2002 |
| CN | 1896770 A | 1/2007 |
| JP | 06138317 | * 5/1994 |

* cited by examiner

*Primary Examiner* — Alessandro Amari
(74) *Attorney, Agent, or Firm* — Andrew C. Cheng

(57) ABSTRACT

An infrared cut filter includes a substrate, a first membrane group on the substrate, a second membrane group on the first membrane group and a third membrane group on the second membrane group. The first, second, third membrane groups include a plurality of first, second, third combined membranes. Each first combined membrane includes a high-refractive index membrane having an optical thickness of 1.2 times $\lambda/4$ and a low-refractive index membrane having an optical thickness of 0.6 times $\lambda/8$ in an alternating fashion. Each second combined membrane includes a high-refractive index membrane having an optical thickness of 1.1 times $\lambda/4$ and a low-refractive index membrane having an optical thickness of 1.1 times $\lambda/8$ in an alternating fashion. Each third combined membrane includes a high-refractive index membrane having an optical thickness of 1.3 times $\lambda/4$ and a low-refractive index membrane having an optical thickness of 1.3 times $\lambda/8$ in an alternating fashion.

9 Claims, 4 Drawing Sheets

INFRARED CUT FILTER AND LENS MODULE USING THE SAME

BACKGROUND

1. Field of the Invention

The present invention relates to an infrared cut filter, and a lens module using the same.

2. Description of Related Art

Generally, an infrared cut (IR-CUT) filter is used in an imaging device that employs a solid-state imaging element, such as a charge-coupled device (CCD) or a complementary metal-oxide semiconductor (CMOS) sensor, to block infrared light while allowing visible light to pass through. A typical infrared cut filter includes a substrate and a multilayer membrane including multiple layers that are laminated in an alternating fashion. However, when light passes through the infrared cut filter at different incident angles, a cut wavelength of the infrared cut filter shifts towards shortwave. Therefore, visible light of wavelengths near infrared wavelengths may be cut.

What is needed, therefore, is to provide an infrared cut filter and a lens module using the same, in which the above problems are eliminated or at least alleviated.

SUMMARY

The present invention relates to an infrared cut filter and a lens module using the same. The infrared cut filter includes a substrate, a first membrane group on the substrate, a second membrane group on the first membrane group, and a third membrane group on the second membrane group. The first membrane group includes a plurality of first combined membranes. Each first combined membrane includes a high-refractive index membrane having an optical thickness 1.2 times $\lambda/4$ and a low-refractive index membrane having an optical thickness 0.6 times $\lambda/8$ in an alternating fashion. The second membrane group includes a plurality of second combined membranes. Each second combined membrane includes a high-refractive index membrane having an optical thickness 1.1 times $\lambda/4$ and a low-refractive index membrane having an optical thickness 1.1 times $\lambda/8$ in an alternating fashion. The third membrane group includes a plurality of third combined membranes. Each third combined membrane includes a high-refractive index membrane having an optical thickness 1.3 times $\lambda/4$ and a low-refractive index membrane having an optical thickness 1.3 times $\lambda/8$ in an alternating fashion.

The lens module, ordered from an object side to an image side thereof, includes a lens group, the infrared cut filter, and an imaging sensor for converting light passing through the lens group and the infrared cut filter in order into electrical signals.

Other advantages and novel features of the present invention will become more apparent from the following detailed description of present embodiments when taken in conjunction with the accompanying drawings.

DETAILED DESCRIPTION OF THE EMBODIMENTS

Reference will now be made to the figures to describe at least one exemplary embodiment in detail.

Figure 1:
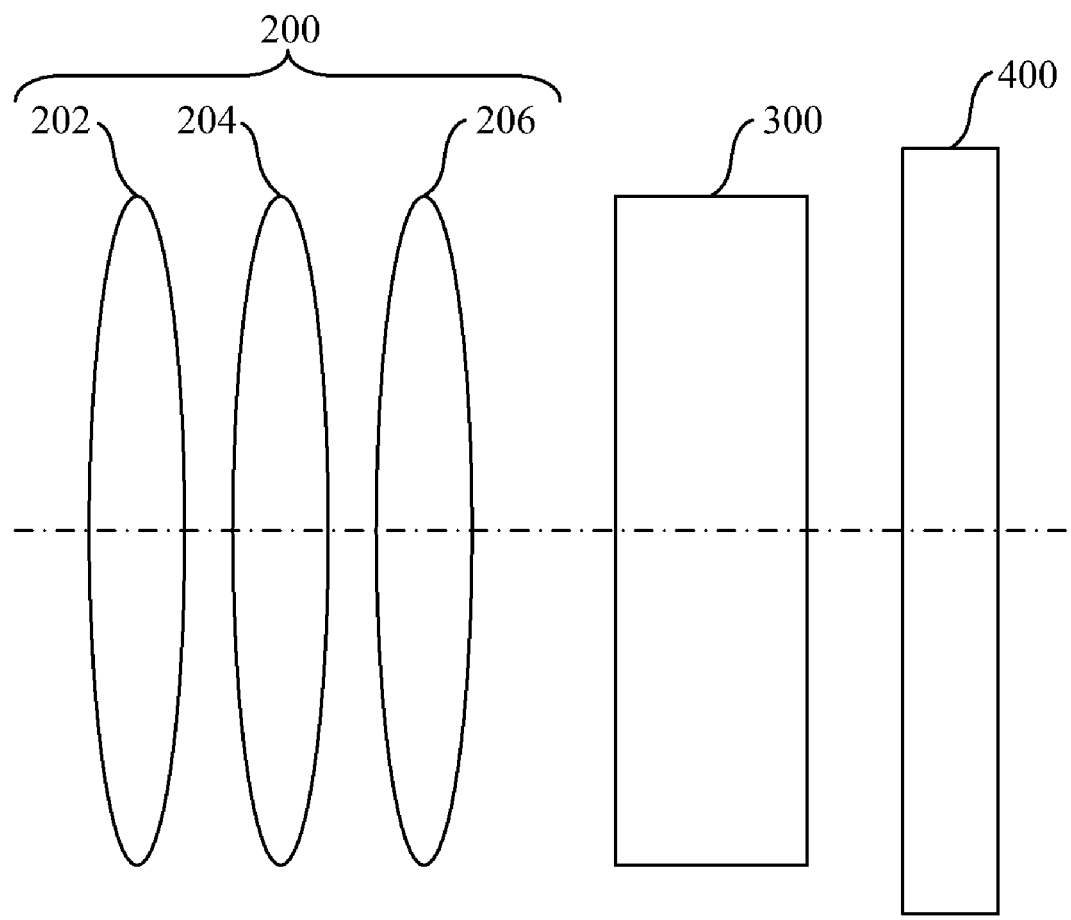
FIG. 1 is a schematic view of a lens module using an infrared cut filter according to an exemplary embodiment.

Referring to FIG. 1, a lens module 20 using an infrared cut (IR-CUT) filter 300, according to a present embodiment, is shown. The lens module 20 can be used in a digital still camera or a camcorder. The lens module 20 includes, in order from an object side to an image side thereof, a lens group 200, the infrared cut filter 300, and an imaging sensor 400. The lens group 200 may include a single lens or several lenses. For example, in this embodiment, the lens group 200 includes three lenses 202, 204, 206 in that order from the object side to the image side of the lens module 20. The lens module 20 is configured for fixing aberration and distortion of the lens module 20 for better imaging quality. The three lenses 202, 204, 206 are moveable relative to each other, for zooming and focusing the lens module 20. The imaging sensor 400 may be a CCD sensor or a complementary metal-oxide semiconductor (CMOS) sensor.

Figure 2:
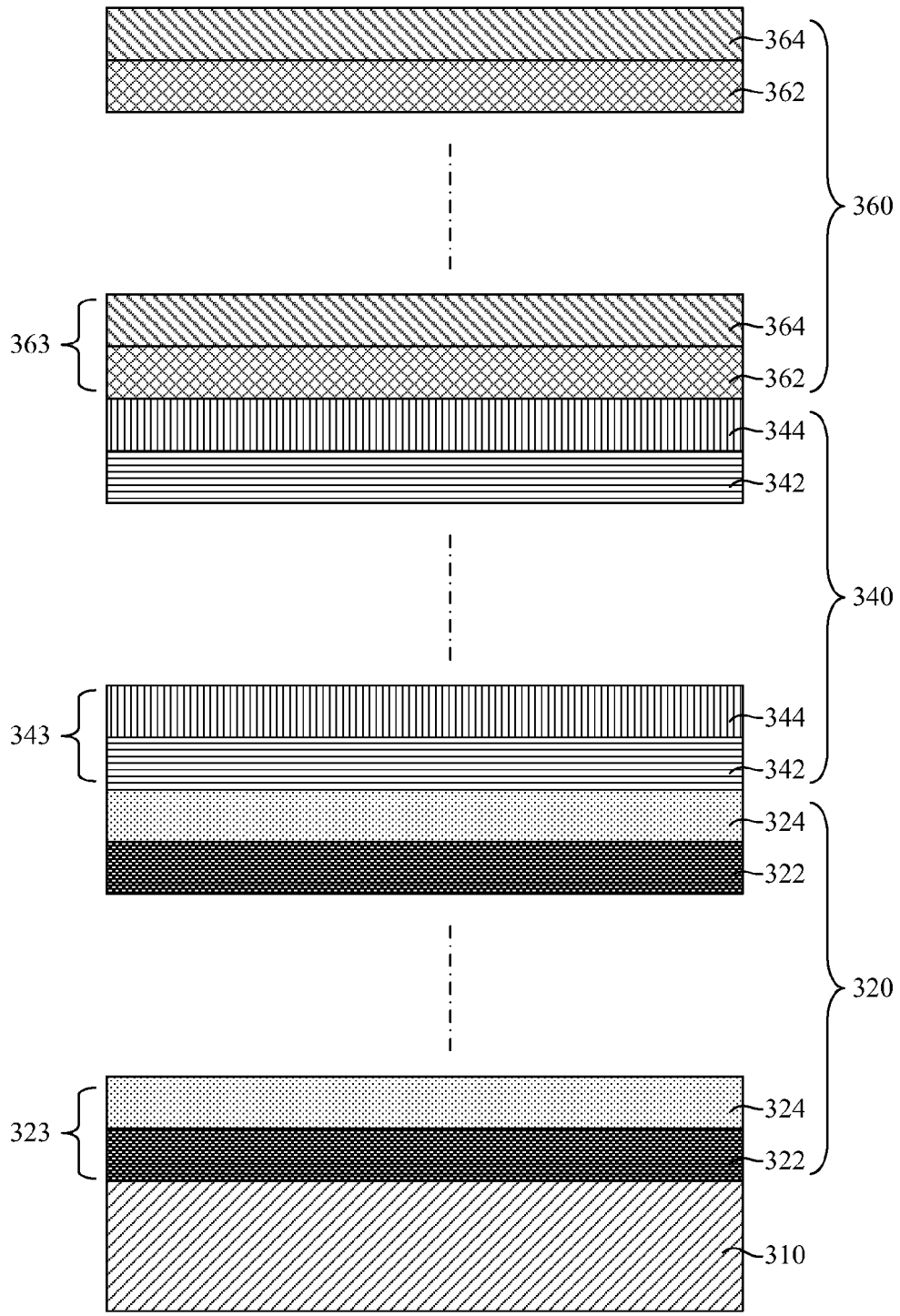
FIG. 2 shows a multilayer structure of the infrared cut filter of FIG. 1.

Referring to FIG. 2, the infrared cut filter 300 includes a substrate 310, a first membrane group 320 formed on the substrate 310, a second membrane group 340 formed on the first membrane group 320, and a third membrane group 360 formed on the second membrane group 340. The first membrane group 320, the second membrane group 340, and the third membrane group 360 have different optical thicknesses, respectively. The substrate 310 may be a K9 glass substrate, which is transparent to visible light. Each membrane group 320, 340, 360 includes multiple layers of high-refractive index membranes and low-refractive index membranes that are laminated in an alternating fashion. In the present embodiment, the first membrane group 320 includes high-refractive index membranes 322 and low-refractive index membranes 324 that are laminated in an alternating fashion. The second membrane group 340 includes high-refractive index membranes 342 and low-refractive index membranes 344 that are laminated in an alternating fashion. The third membrane group 360 includes high-refractive index membranes 362 and low-refractive index membranes 364 that are laminated in an alternating fashion. A first high-refractive index membrane 322 of the first membrane group 320 is formed on the substrate 310. The high-refractive index membrane may be made of a material such as titanium dioxide ($TiO_2$), niobium pentaoxide ($Nb_2O_5$), or tantalum pentoxide ($Ta_2O_5$). The low-refractive index membrane may be made of silicon dioxide ($SiO_2$).

In this embodiment, a design wavelength $\lambda$ of the infrared cut filter 300 is 760 nanometers (nm). The first membrane group 320 includes a plurality of first combined membranes 323. Each first combined membrane 323 includes a high-refractive index membrane 322 having an optical thickness 1.2 times $\lambda/4$ (hereinafter $\lambda/4$ is expressed as H) and a low-refractive index membrane 324 having an optical thickness 0.6 times $\lambda/8$ (hereinafter $\lambda/8$ is expressed as L). The second membrane group 340 includes a plurality of second combined membranes 343. Each second combined membrane 343 includes a high-refractive index membrane 342 having an optical thickness of 1.1×H and a low-refractive index membrane 344 having an optical thickness of 1.1×L. The third membrane group 360 includes a plurality of third combined membranes 363. Each third combined membrane 363 includes a high-refractive index membrane 362 having an optical thickness of 1.3×H and a low-refractive index membrane 364 having an optical thickness of 1.3×L. The first and second membrane groups 320, 340 each may include 6-8 combined membranes 323, 343, and the third membrane group may include 7-9 combined membranes 363. A physical thickness D of each of the membranes satisfies a formula:

D=S/n, where S is optical thickness of the membrane, and n is a refractive index of the membrane.

Figure 3:
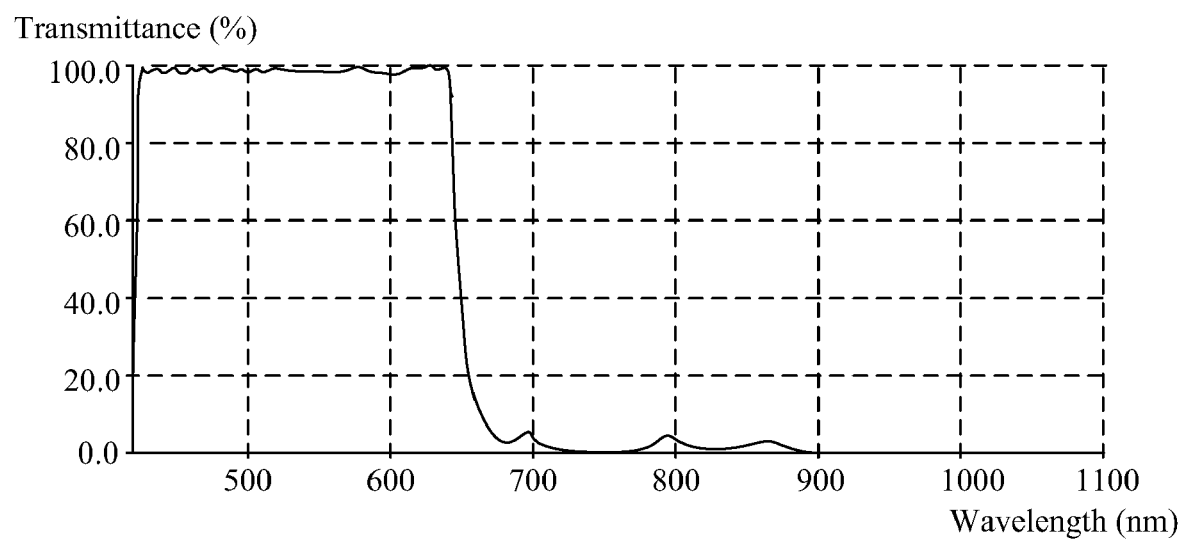
FIG. 3 shows a transmitted spectrum diagram of the infrared cut filter of FIG. 1.

Referring to FIG. 3, a transmitted spectrum diagram of the infrared cut filter 300 is shown. In the spectrum diagram, a horizontal axis of the diagram represents a wavelength of light passing through the infrared cut filter 300, and a vertical axis of the diagram represents transmittance of light. When light having a wavelength more than 700 nm passes through the infrared cut filter 300, transmittance of such light is approximately equal to 0%. When light having a wavelength less than 700 nm passes through the infrared cut filter 300, transmittance of such light goes from about 0% to about 100% rapidly. In other words, visible light having a wavelength of 400-700 nm can pass through the infrared cut filter 300 without much energy loss, whereas the infrared light can be almost completely cut by the infrared cut filter 300.

Figure 4:
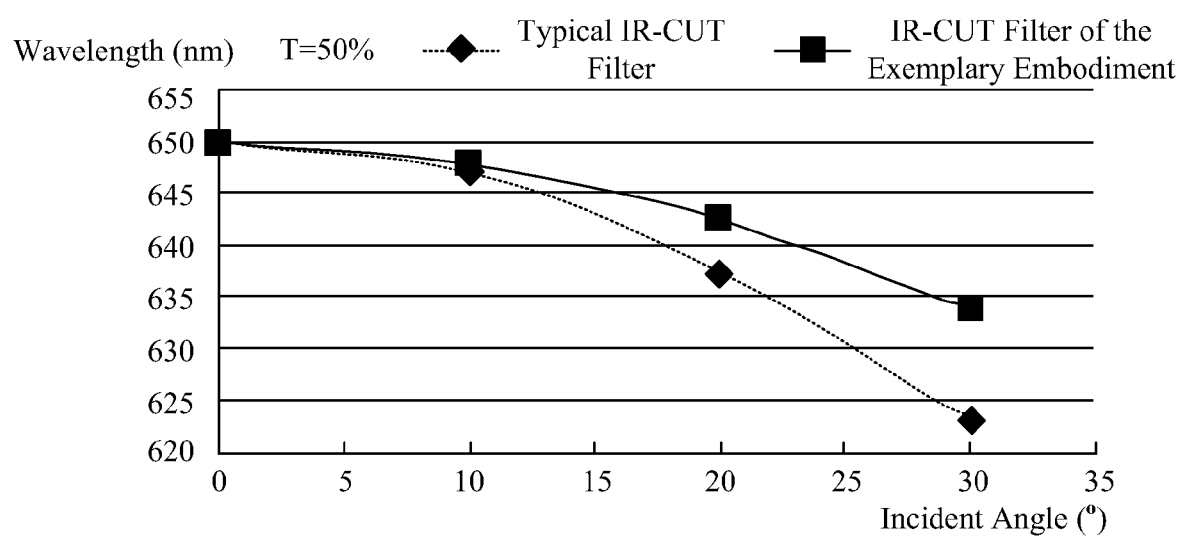
FIG. 4 shows a shortwave shift diagram of the infrared cut filter of FIG. 1 and a typical infrared cut filter.

Referring to FIG. 4 and Table 1 below, a shortwave shift diagram of the infrared cut filter 300 and a typical infrared cut filter at different light incident angles is shown. In the shift diagram, a horizontal axis of the diagram represents an incident angle of light passing through the infrared cut filter 300, and a vertical axis of the diagram represents a wavelength of light. Table 1 shows respective wavelengths corresponding to different incident angles at a predetermined transmittance.

TABLE 1

| Incident Angle | Wavelength of a typical infrared cut filter | Wavelength of the infrared cut filter 300 |
|---|---|---|
| 0° | 650 nm | 650 nm |
| 10° | 647 nm | 648 nm |
| 20° | 637.5 nm | 642.5 nm |
| 30° | 623 nm | 634 nm |

Taking transmittance of 50% for example, when the incident angle of light changes from 0° to 30°, wavelength of light passing through the typical infrared cut filter changes from 650 nm to 623 nm, whereas wavelength of light passing through the infrared cut filter 300 changes from 650 nm to 634 nm, as shown in Table 1. The amount of shortwave shift of the infrared cut filter 300 is less than that of the typical infrared cut filter. Therefore, the infrared cut filter 300 can limit the shortwave shift much better than the typical infrared cut filter preventing the infrared cut filter 300 from cutting required visible light.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An infrared cut filter comprising:
    a substrate;
    a first membrane group formed on the substrate, the first membrane group comprising a plurality of first combined membranes, each first combined membrane including a high-refractive index membrane having an optical thickness 1.2 times $\lambda/4$ and a low-refractive index membrane having an optical thickness 0.6 times $\lambda/8$ laminated in an alternating fashion;
    a second membrane group formed on the first membrane group, the second membrane group comprising a plurality of second combined membranes, each second combined membrane including a high-refractive index membrane having an optical thickness 1.1 times $\lambda/4$ and a low-refractive index membrane having an optical thickness 1.1 times $\lambda/8$ laminated in an alternating fashion; and
    a third membrane group formed on the second membrane group, the third membrane group comprising a plurality of third combined membranes, each third combined membrane including a high-refractive index membrane having an optical thickness 1.3 times $\lambda/4$ and a low-refractive index membrane having an optical thickness 1.3 times $\lambda/8$ laminated in an alternating fashion;
    wherein $\lambda$ is a design wavelength of the infrared cut filter.

2. The infrared cut filter of claim 1, wherein number of the first combined membranes is in the range of 6-8, number of the second combined membranes is in the range of 6-8, and number of the third combined membranes is in the range of 7-9.

3. The infrared cut filter of claim 1, wherein material of the high-refractive index membranes is one of titanium dioxide, niobium pentoxide, and tantalum pentoxide.

4. The infrared cut filter of claim 1, wherein material of the low-refractive index membranes is silicon dioxide.

5. The infrared cut filter of claim 1, wherein the design wavelength of the infrared cut filter is 760 nanometers.

6. A lens module ordered from an object side to an image side thereof comprising:
    a lens group, an infrared cut filter, and an imaging sensor for converting light passing through the lens group and the infrared cut filter in order into electrical signals, the infrared cut filter comprising:
    a substrate;
    a first membrane group formed on the substrate, the first membrane group comprising a plurality of first combined membranes, each first combined membrane including a high-refractive index membrane having an optical thickness 1.2 times $\lambda/4$ and a low-refractive index membrane having an optical thickness 0.6 times $\lambda/8$ laminated in an alternating fashion;
    a second membrane group formed on the first membrane group, the second membrane group comprising a plurality of second combined membranes, each second combined membrane including a high-refractive index membrane having an optical thickness 1.1 times $\lambda/4$ and a low-refractive index membrane having an optical thickness 1.1 times $\lambda/8$ laminated in an alternating fashion; and
    a third membrane group formed on the second membrane group, the third membrane group comprising a plurality of third combined membranes, each third combined membrane including a high-refractive index membrane having an optical thickness 1.3 times $\lambda/4$ and a low-refractive index membrane having an optical thickness 1.3 times $\lambda/8$ laminated in an alternating fashion;
    wherein $\lambda$ is a design wavelength of the infrared cut filter.

7. The lens module of claim 6, wherein number of the first combined membranes is in the range of 6-8, number of the second combined membranes is in the range of 6-8, and number of the third combined membranes is in the range of 7-9.

8. The lens module of claim 6, wherein material of the high-refractive index membranes is one of titanium dioxide, niobium pentaoxide, and tantalum pentoxide.

9. The lens module of claim 6, wherein material of the low-refractive index membranes is silicon dioxide.

* * * * *